(12) United States Patent
Nakanishi et al.

(10) Patent No.: US 7,374,728 B2
(45) Date of Patent: May 20, 2008

(54) EXHAUST GAS PURIFICATION SYSTEM

(75) Inventors: Yoshiyuki Nakanishi, Saitama (JP); Kenji Dosaka, Saitama (JP); Keizo Iwama, Saitama (JP); Shinya Ishimaru, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 707 days.

(21) Appl. No.: 10/792,927

(22) Filed: Mar. 5, 2004

(65) Prior Publication Data

US 2004/0175306 A1  Sep. 9, 2004

(30) Foreign Application Priority Data

| Mar. 6, 2003 | (JP) | ............................. 2003-060435 |
| Mar. 24, 2003 | (JP) | ............................. 2003-079677 |
| Apr. 3, 2003 | (JP) | ............................. 2003-100486 |

(51) Int. Cl.
  *B01D 53/34* (2006.01)
  *B01D 50/00* (2006.01)
(52) U.S. Cl. .................. 422/177; 422/168; 422/169
(58) Field of Classification Search ............... 422/177, 422/168, 169
  See application file for complete search history.

(56) References Cited

U.S. PATENT DOCUMENTS

| 3,844,980 | A | * | 10/1974 | Sakai et al. ................. 502/324 |
| 4,171,289 | A | * | 10/1979 | Wheelock .................... 502/333 |
| 5,073,656 | A | * | 12/1991 | Chafin et al. ............... 585/500 |
| 5,380,692 | A | * | 1/1995 | Nakatsuji et al. ........... 502/303 |
| 5,422,085 | A | * | 6/1995 | Bell et al. ................. 423/213.5 |
| 5,534,475 | A | * | 7/1996 | Miramontes Cardenas et al. .......................... 502/304 |
| 5,741,468 | A | * | 4/1998 | Saito et al. ............... 423/239.1 |
| 5,788,936 | A | * | 8/1998 | Subramanian et al. ... 423/213.2 |
| 6,202,407 | B1 | * | 3/2001 | Brusasco et al. ............. 60/274 |
| 2002/0081242 | A1 | * | 6/2002 | Labarge et al. ............. 422/177 |

FOREIGN PATENT DOCUMENTS

| JP | 5-92125 | 4/1993 |
| JP | 6-31173 | 2/1994 |
| JP | 6-99031 | 4/1994 |
| JP | 2909553 | 4/1999 |
| JP | 2002-210366 | 7/2002 |
| WO | WO 0216014 A1 * | 2/2002 |

* cited by examiner

Primary Examiner—Alexa D. Neckel
Assistant Examiner—Matthew J Merkling
(74) Attorney, Agent, or Firm—Arent Fox LLP

(57) ABSTRACT

An exhaust gas purification system that is equipped, from an upstream side toward downstream side through which an exhaust gas flows, with a plasma reactor and a $NO_x$ selective reduction catalyst unit having a $NO_x$ selective reduction catalyst layer acting on the exhaust gas, and which system provides a reducing agent adding means adding a reducing agent to the exhaust gas at an upstream side of the plasma reactor, wherein the $NO_x$ selective reduction catalyst layer comprises nickel and a $NO_x$ selective reduction catalyst or wherein the $NO_x$ selective reduction catalyst layer contains γ-alumina that supports magnesium or wherein the $NO_x$ selective reduction catalyst unit comprises a first purification unit where an exhaust gas via the plasma reactor is introduced, and a second purification unit where an exhaust gas via the first purification unit is introduced.

9 Claims, 11 Drawing Sheets

EXHAUST GAS PURIFICATION SYSTEM

BACKGROUND OF THE INVENTION

1. Field of the Invention

The present invention relates to an exhaust gas purification system, and in more particular, to an exhaust gas purification system for purifying a NOx in an exhaust gas exhausted from a NOx exhaust source such as a lean-burn engine and a gasoline direct-injection engine under an excess oxygen atmosphere.

2. Description of the Related Art

Conventionally, as a system for purifying nitrogen oxides (hereinafter referred to as $NO_x$) even under a condition where an oxygen concentration is high like an exhaust gas of a diesel engine, an exhaust gas purification system using a $NO_x$ adsorptive catalyst and another one using an urea-selective catalytic reduction (Urea-SCR) are known. However, the exhaust gas purification system using the $NO_x$ adsorptive catalyst has a problem that a huge fuel consumption loss occurs because it needs to change an air-fuel ratio of an engine from lean to rich and further to stoichiometric. On the other hand, in the exhaust gas purification system using the urea-selective catalytic reduction, a problem remains in a point that a development of infrastructure of an urea becomes indispensable.

Consequently, to solve these problems, systems using $NO_x$ selective reduction catalysts, to be more precise, a platinum catalyst (for example, from a 14th row in a fifth column to a 25th row in a sixth column of page 3 of Japanese patent 2909553), an iridium catalyst (for example, from a fourth row in a fifth column to a 20th row in a sixth column of page 4 of Japanese patent laid-open publication Hei 6-31173), and a silver catalyst (for example, from a 35th row in a sixth column of page 4 to a 22th row in an eighth column of page 5 of Japanese patent-laid open publication Hei 5-92125) instead of the $NO_x$ adsorptive catalyst and urea-selective catalytic reduction are proposed.

However, in an exhaust gas purification system using the platinum catalyst if a reducing agent, for example, a hydrocarbon (hereinafter referred to as HC) is not added to an exhaust gas, a $NO_x$ purification ratio becomes low, and if an added amount of the reducing agent is increased, a temperature of the $NO_x$ selective reduction catalyst becomes out of a range of a purification temperature region due to oxidizing heat, so a system with a high purification ratio cannot be built.

In addition, in an exhaust gas purification system using the iridium catalyst, a $NO_x$ purification temperature of the catalyst is high and moreover the catalyst cannot be said to be sufficient in a selectivity for a paraffin. Accordingly, in the exhaust gas purification system an exhaust gas temperature is low, so if it is applied to a diesel engine of which paraffin concentration is high in an exhaust gas, it cannot sufficiently purify the $NO_x$ in the exhaust gas.

In addition, in an exhaust gas purification system using the silver catalyst, a $NO_x$ purification temperature of the catalyst is high, so if it is applied to a diesel engine of which exhaust gas temperature is low, it cannot sufficiently purify the $NO_x$ in the exhaust gas.

Relating to such the technologies, "Plasma-Assist Catalyst for Cleaning $NO_x$" in which a plasma reactor and silver/alumina catalyst are combined is proposed (for example, see pages 2 to 5 and FIG. 1 in Japanese patent laid-open publication 2002-210366).

However, in "Plasma-Assist Catalyst for Cleaning $NO_x$" disclosed in Japanese patent laid-open publication 2002-210366, there exists a problem that when adding the HC and the like as a reducing agent to maintain the $NO_x$ purification ratio, caulking occurs and thereby the NOx purification ratio is lowered with a change over time. As one of its causes, as shown in FIG. 11, it is thought that the HC and the like invade in a recessed position of narrow porosities 124 of a $NO_x$ selective reduction catalyst layer 120 stacked on a support body 111. The HC and the like are then self-collected on surfaces of porous supports 121, and thereby become incrustations 126 with which $NO_x$ selective reduction catalysts 122 such as silver supported on the surfaces of the porous supports 121 are coated.

Thus, since the incrustations 126 damage a catalytic function of the $NO_x$ selective reduction catalysts 122 and decrease a contact area with an exhaust gas finally occluding the narrow porosities 124, there exists a problem that the $NO_x$ purification ratio becomes lowered. Meanwhile, a phenomenon that the $NO_x$ purification ratio thus becomes lowered due to the incrustations 126 is called "caulking."

In addition, as a configuration of another conventional exhaust gas purification system is known such one where an HC adding device, a plasma reactor, a purification device having a $NO_x$ selective reduction catalyst are provided with an exhaust pipe of an diesel engine from its $NO_x$ exhaust resource side in this order and thereby purifies the $NO_x$ in an exhaust gas. The HC adding device is a device to add the HC as a reducing agent to the exhaust gas since an HC amount is few in the exhaust gas of the diesel engine, and in the purification device a catalyst where a zeolite is made to support active compositions such as Cu, Co, and the like is used (for example, see pages 2 to 5 and FIG. 1 in Japanese patent laid-open 2002-210366).

When using the zeolite as a support as described above, the zeolite partially oxidizes the HC of a reducing agent and produces an active CHO with a strong reducing ability by an oxidizing ability of the active compositions and an acid titer of the zeolite, thereby the $NO_x$ being able to be reduced and purified by the active CHO. Since even if a temperature of an exhaust gas is low, the CHO is produced, the zeolite is suitable for an exhaust gas treatment of the diesel engine.

However, since in the zeolite an adsorption of the HC tends to precede a partial oxidization of the HC and the zeolite is added comparatively more in amount taking its reactivity into consideration, the adsorption amount of the HC mounts. Therefore, when an exhaust gas temperature is low, an adsorbed HC is not separated, and resultingly, there exists a problem that an occurrence of caulking could cause a lowering of the $NO_x$ purification ratio.

Accordingly, an exhaust gas purification system of which $NO_x$ purification ratio is higher is strongly requested.

In addition, an exhaust gas purification system that is designed to be able to maintain a higher $NO_x$ purification ratio over a long period by restraining the occurrence of the caulking in the zeolite when using it as a support is also requested.

SUMMARY OF THE INVENTION

A first aspect of the invention to solve the problems described above is an exhaust gas purification system, which is equipped, from an upstream side toward downstream side through which an exhaust gas flows, with a plasma reactor and a $NO_x$ selective reduction catalyst unit having a $NO_x$ selective reduction catalyst layer acting on the exhaust gas, and which system provides a reducing agent adding means adding a reducing agent to the exhaust gas at an upstream side of the plasma reactor, wherein the $NO_x$ selective reduction catalyst layer is characterized by containing nickel and a $NO_x$ selective reduction catalyst.

Such the exhaust gas purification system makes the $NO_x$ in the exhaust gas purified with the $NO_x$ and $NO_2$ being dissolved by the reducing agent and $NO_x$ selective reduction catalyst.

Since the caulking becomes difficult to occur with an excess reducing agent being properly oxidized/removed by nickel with a high oxidizing ability, a continual use of the exhaust gas purification system also makes the $NO_x$ purification ratio difficult to be lowered.

A second aspect of the invention is an exhaust gas purification system with the first aspect characterized in that a nickel content is not less than 0.9 mass percent and not more than 3.6 mass percent for a $NO_x$ selective reduction catalyst layer.

Such the exhaust gas purification system enables the $NO_x$ to be favorably purified since nickel is contained in the $NO_x$ selective reduction catalyst layer by not less than 0.9 mass percent and not more than 3.6 mass percent.

A third aspect of the invention is an exhaust gas purification system with any one of the first and second aspects characterized in that the $NO_x$ selective reduction catalyst layer contains silver.

Such the exhaust gas purification system enables the $NO_x$ to be favorably purified without the $NO_x$ purification ratio being lowered since silver is contained in the $NO_x$ selective reduction catalyst layer.

A fourth aspect of the invention is an exhaust gas purification system with the third aspect characterized in that a silver content is not less than 1.5 mass percent and not more than 5 mass percent for the $NO_x$ selective reduction catalyst layer.

Such the exhaust gas purification system enables the $NO_x$ to be favorably purified without the $NO_x$ purification ratio being lowered since silver is contained in the $NO_x$ selective reduction catalyst layer by not less than 1.5 mass percent and not more than 5 mass percent.

Moreover, the inventors of the present invention have devoted themselves to solve the problems and have discovered that when using a $NO_x$ selective reduction catalyst containing specific γ-alumina that is lowered in acid titer, the caulking of the $NO_x$ selective reduction catalyst is prevented.

A fifth aspect of the invention is an exhaust gas purification system with the first aspect characterized in that the $NO_x$ selective reduction catalyst layer contains γ-alumina.

In the exhaust gas purification system, when an exhaust gas containing the $NO_x$ passes through a plasma reactor, the $NO_x$ other than $NO_2$ is converted to $NO_2$, and when a reducing agent added in the exhaust gas passes through the plasma reactor, the reducing agent is excited.

And when the excited reducing agent, $NO_2$, and residual $NO_x$ that is not converted to $NO_2$ in the plasma reactor reach the $NO_x$ selective reduction catalyst unit, these are taken within the $NO_x$ selective reduction catalyst layer and dissolved into $CO_2$, $H_2O$, and $N_2$.

On the other hand, the γ-alumina supporting magnesium in the $NO_x$ selective reduction catalyst layer is lowered in acid titer. That is, the lowering of the acid titer of the γ-alumina makes the incrustations of the reducing agent on the γ-alumina restrained. Accordingly, the exhaust gas purification system makes a favorable $NO_x$ purification ratio maintained since an activity for the $NO_x$ of the $NO_x$ selective reduction catalyst layer is favorably maintained even over time.

A sixth aspect of the invention is an exhaust gas purification system with the fifth aspect characterized in that an acid titer of γ-alumina in question is not more than 120 μmol/g by the γ-alumina of the fifth aspect supporting a magnesium of not less than 5 mass percent and not more than 10 mass percent for the γ-alumina in question.

Such the exhaust gas purification system more favorably purifies the $NO_x$ without lowering the $NO_x$ purification ratio even in continuing on performing a $NO_x$ purification treatment of an exhaust gas while introducing a reducing agent into the system by the γ-alumina supporting the magnesium of not less than 5 mass percent and not more than 10 mass percent for the γ-alumina in question and the acid titer of the γ-alumina in question being not more than 120 μmol/g.

A seventh aspect of the invention is an exhaust gas purification system with any one of the fifth and sixth aspects characterized in that the $NO_x$ selective reduction catalyst layer contains silver.

Such the exhaust gas purification system enables the $NO_x$ to be favorably purified without the $NO_x$ purification ratio being lowered even in continuing on performing a $NO_x$ purification treatment of an exhaust gas while introducing a reducing agent into the system since silver is contained in the $NO_x$ selective reduction catalyst layer.

An eighth aspect of the invention is an exhaust gas purification system with the seventh aspect characterized in that a silver content in the $NO_x$ selective reduction catalyst layer is not less than 1.5 mass percent and not more than 5 mass percent.

Such the exhaust gas purification system enables the $NO_x$ to be further favorably purified without the $NO_x$ purification ratio being lowered since the silver content in the $NO_x$ selective reduction catalyst layer is not less than 1.5 mass percent and not more than 5 mass percent.

Still moreover, the inventors of the invention have devoted themselves to solve the problems and discovered an exhaust gas purification system that can achieve a higher $NO_x$ purification ratio.

A ninth aspect of the invention is an exhaust gas purification system with the first aspect characterized in that: the $NO_x$ selective reduction catalyst unit comprises a first purification unit where an exhaust gas via the plasma reactor is introduced, and a second purification unit where an exhaust gas via the first purification unit is introduced; and the first purification unit comprises an $Ag/Al_2O_3$ catalyst where Ag is supported by alumina, and the second purification unit comprises an Ag/zeolite catalyst where Ag is supported by zeolite.

Such the exhaust gas purification system enables the caulking in the zeolite to be restrained since a reducing agent HC is oxidized by the $Ag/Al_2O_3$ catalyst provided at the first purification unit, thereby being decreased, and thus the adsorption amount of the HC in the zeolite becomes less depending on its decrease. On the other hand, at the second purification unit a predetermined amount of HC being obtained, the reducing agent HC is partially oxidized by ability of the Ag/zeolite catalyst, that is, oxidizing ability of Ag and an acid titer of the zeolite, and an active CHO is produced, whereby the $NO_x$ is reduced and purified by the active CHO. The $NO_x$ purification ratio in this case is maintained high and for a long period based on the restraint of the caulking.

DESCRIPTION OF THE PREFERRED EMBODIMENTS

Hereinafter, the embodiments of the present invention will be described in detail, referring to FIGS. 1 to 4 as needed.

Exhaust Gas Purification System

Figure 1:
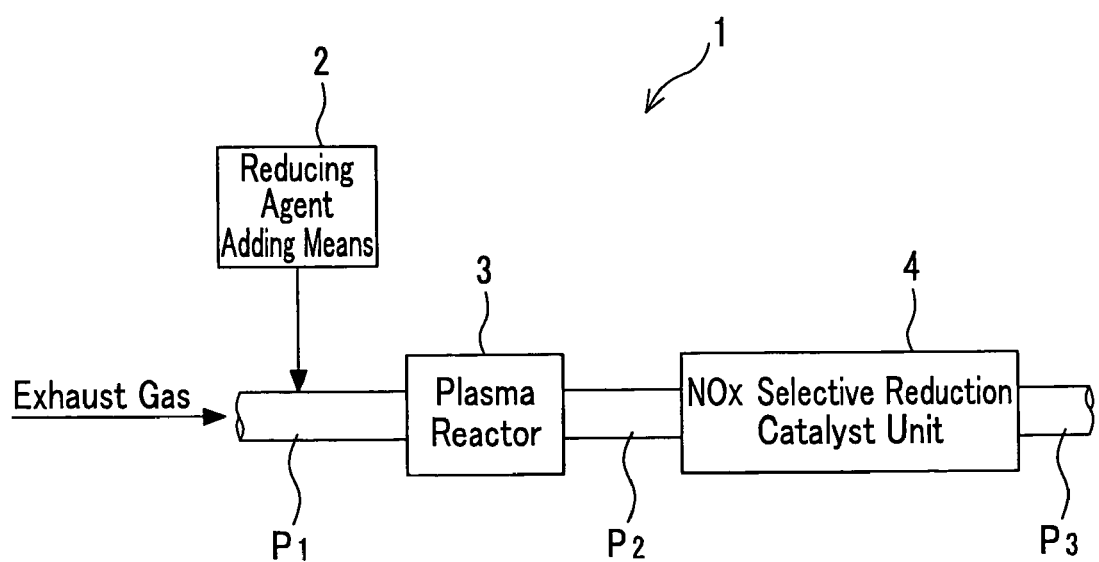
FIG. 1 is a block diagram schematically showing a configuration of an exhaust gas purification system related to the embodiments f the present invention.

As shown in FIG. 1, an exhaust gas purification system 1 is a system that is equipped, from a gas generating side (upstream side) toward an exhaust side (downstream side), with a plasma reactor 3 and a $NO_x$ selective reduction catalyst unit 4 through piping (P1 to P3), wherein a reducing agent adding means 2 is provided at an upstream side of the plasma reactor 3, thereby the $NO_x$ in an exhaust gas being purified under an excess oxygen atmosphere.

Reducing Agent Adding Means

The reducing agent adding means 2 is a means to supply a reducing agent with an exhaust gas within the piping P1 at the upstream side of the plasma reactor 3. The reducing agent adding means 2 can be configured of, for example, a known fuel injection mechanism used to inject a fuel in piping of an engine, a post injection mechanism, and the like.

A reducing agent for use in the reducing agent adding means 2 is not specifically restricted in the invention if it reduces the $NO_x$ in an exhaust gas, and, for example, hydrocarbons (HC) can be used.

In addition, for example, when the exhaust gas purification system 1 is applied to a diesel vehicle mounting a diesel engine, a fuel (light oil) of the diesel engine including the HC as a reducing agent is used and the system 1 can be easily configured so that the fuel is supplied from a fuel tank into the piping P1 by providing an ejector, sending pump, piping, and the like as needed.

Plasma Reactor

The plasma reactor 3 converts the $NO_x$ in an exhaust gas due to combustion under an excess oxygen atmosphere such as a lean burn engine, gasoline direct injection engine, and diesel engine to $NO_2$ with plasmas. In addition, the plasma reactor 3 produces an active kind such as a radical from a reducing agent such as the HC added by the reducing agent adding means 2. Moreover, the plasma reactor 3 can also oxidize a PM (particulate matter) such as sulphates produced from particles of an unburned fuel and sulfur in the fuel.

The plasma reactor 3 is not specifically restricted if it achieves the objects of the invention, and can be used by being selected from known plasma reactors such as corona discharge, pulse discharge, and barrier discharge types as needed. Among these, taking the oxidizing ability of the PM and $NO_x$ into consideration, it is preferable to select the barrier discharge type of the plasma reactor 3.

In addition, although the embodiment disposes one plasma reactor 3 as shown in FIG. 1, a plurality of plasma reactors 3 may be disposed serially and parallelly as needed, depending on kinds of exhaust gases, applied embodiments, and the like.

$NO_x$ Selective Reduction Catalyst Unit

Although the $NO_x$ selective reduction catalyst unit 4 is disposed at the downstream side of the plasma reactor 3, and inside it is equipped with a catalyst component 10 including a support body 11 with a plurality of narrow porosities 11a through which an exhaust gas flows (see FIG. 2), there exist two types of units in the unit 4. One type has one catalyst component 10, whereas the other type has two purification units (see FIG. 9) and each unit has one catalyst component 10.

Any catalyst component 10 has the support body 11 and $NO_x$ selective reduction catalyst layer 20 formed so as to cover inner wall surfaces 11b surrounding a plurality of the narrow porosities 11a of the support body 11.

Here, the $NO_x$ selective reduction catalyst layer 20 is in some cases called a "wash coat (layer)" since as described later it is manufactured by impregnating the support body 11 in a slurry form of a $NO_x$ selective reduction catalyst slurry.

Figure 2:
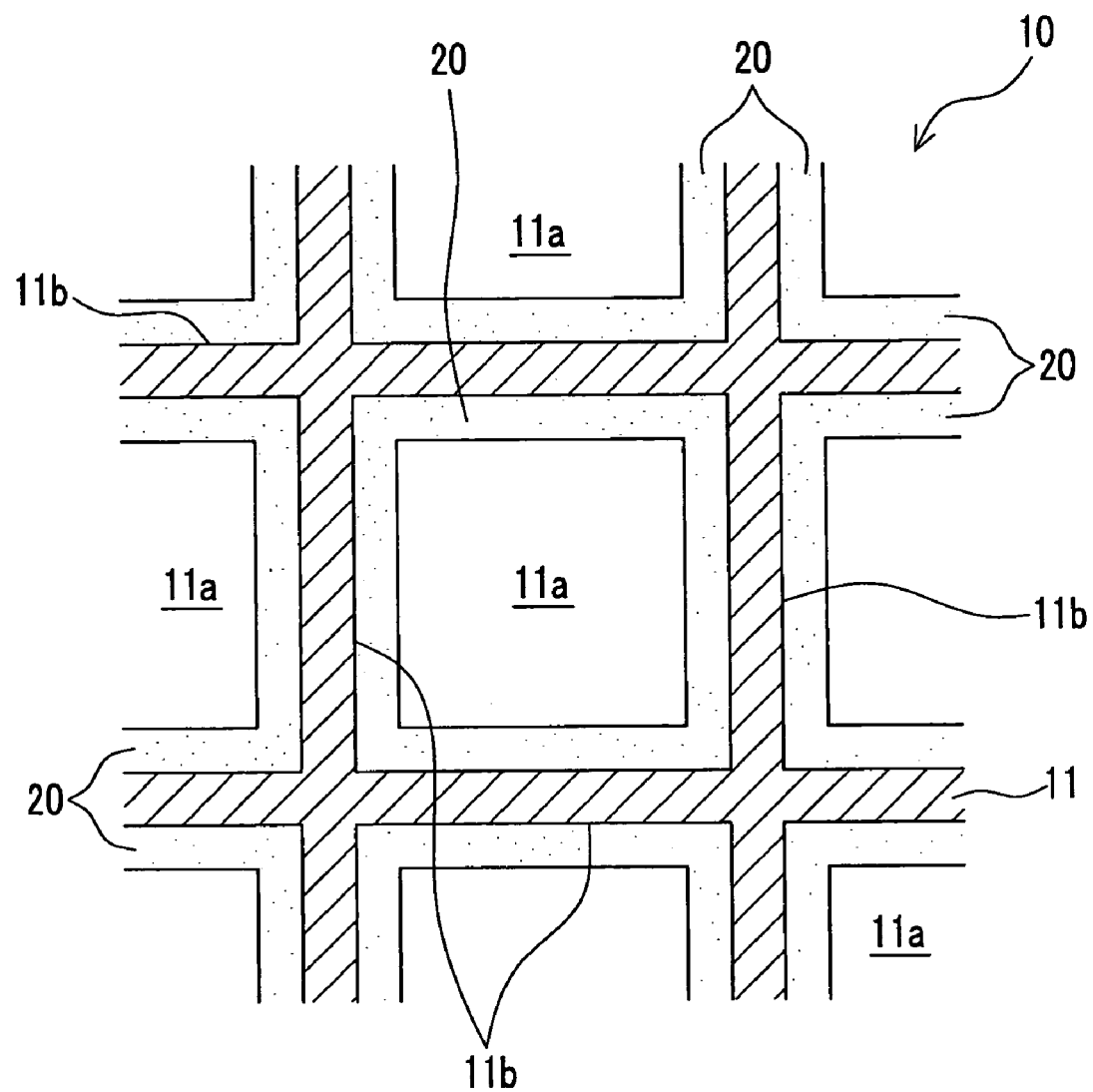
FIG. 2 is a partial section view showing a catalyst component of a $NO_x$ selective reduction catalyst unit of the exhaust gas purification system shown in FIG. 1.

A shape of the support body 11 is not specifically restricted if it has a space through which an exhaust gas flows, and as shown in FIG. 2, taking a contact area with the exhaust gas and mechanical strength into consideration, a honeycomb-shaped support body where a plurality of narrow porosities are formed is used.

In addition, the support body 11 is preferable to be formed from a material having a heat resistance. As for such the material, a porous body (ceramics) such as a cordierite, mullite, silicon carbide (SiC), and metal (for example, stainless steel), and the like are cited.

There exist four types of $NO_x$ selective reduction catalyst layers 20 in the invention. First and second types of the layers 20 are relevant to the $NO_x$ selective reduction catalyst unit 4 with one catalyst component 10, and third and fourth types of the layers 20 are relevant to the $NO_x$ selective reduction catalyst unit 4 with two catalyst components 10, that is, one component 10 for each of two purification units.

Figure 3A:
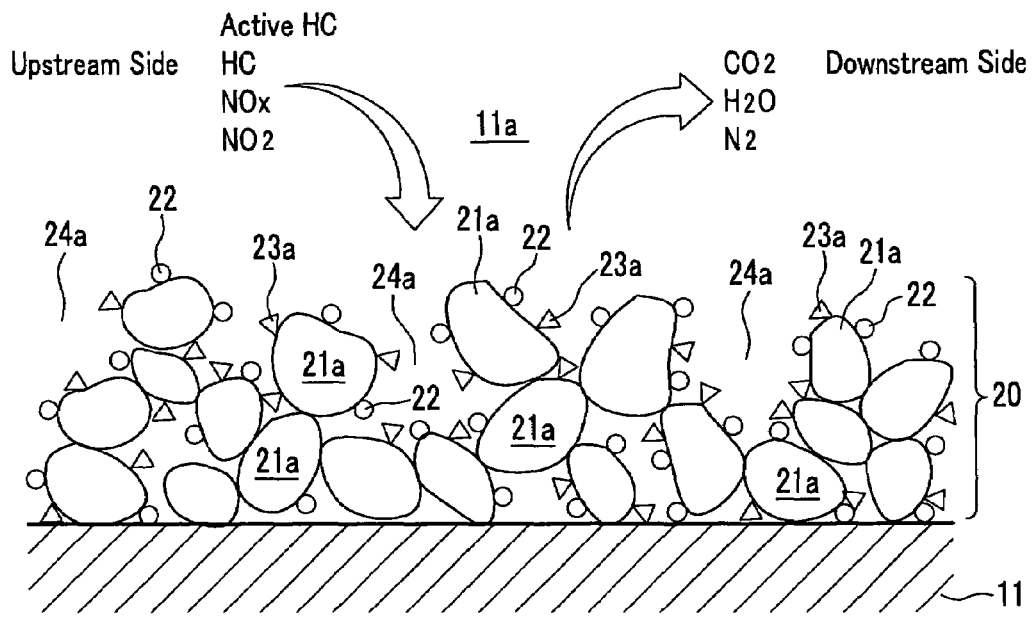
FIGS. 3A and 3B are partially enlarged views showing two types of $NO_x$ selective reduction catalyst layers of the catalyst component shown in FIG. 2.

As shown in FIG. 3A, the first type of a $NO_x$ selective reduction catalyst layer 20 is formed of porous supports 21a that becomes a skeleton and silvers 22 and nickels 23a supported on surfaces of the porous supports 21a as main portions thereof. Inside the $NO_x$ selective reduction catalyst layer 20 are formed a plurality of continuous narrow porosities 24a continuing to the narrow porosities 11a of the support body 11. Thus for the $NO_x$ selective reduction catalyst layer 20 to have a plurality of continuous narrow porosities 24a remarkably increases a contact area with an exhaust gas, thereby the $NO_x$ being able to be effectively purified.

The porous supports 21a can be formed by being selected, for example, from alumina, zeolite, silica, titania, zirconia, and slica/alumina as needed and using them.

The silvers 22 are a catalyst to promote a dissolution reaction of the $NO_x$ and $NO_2$ by a reducing agent such as the HC.

Here, a content of the silvers 22 is preferable to be within a range of not less than 1.5 mass percent and not more than 5.0 mass percent for the mass of the $NO_x$ selective reduction catalyst layer 20 (preferable range), and further preferable to be within a range of not less than 2.0 mass percent and not more than 4.0 mass percent (optimum range).

Figure 4:
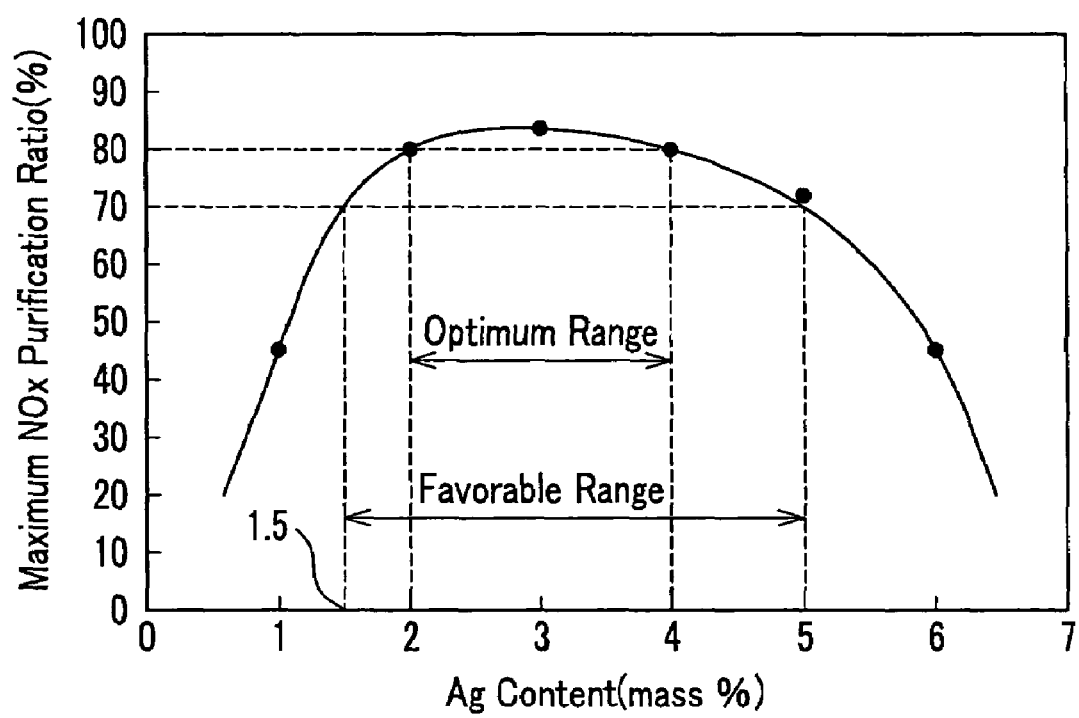
FIG. 4 is a graph showing a relationship between a silver content in each $NO_x$ selective reduction catalyst layer of FIGS. 3A and 3B, and a $NO_x$ purification ratio.

As shown in FIG. 4, this is because when the content of the silvers 22 becomes less than 1.5 mass percent, the contact area with the $NO_x$ becomes smaller, that is, a dissolution reaction place becomes less, the $NO_x$ purification ratio becomes less than 70 percent, thereby the effective purification of the $NO_x$ tends not to be expected. On the other hand, when the content of the silvers 22 becomes more than 5.0 mass percent, the reducing agent to be added to reduce the $NO_x$ is preferentially reduced, and resultingly, the $NO_x$ purification ratio becomes less than 70 percent, thereby the effective purification of the $NO_x$ tends not to be expected. On the contrary, when the content of the silvers 22 is within the range of not less than 1.5 mass percent and not more than 5.0 mass percent, the $NO_x$ purification ratio becomes not less than 80 percent, thereby the $NO_x$ being able to be more favorably purified.

Meanwhile, FIG. 4 is a graph showing a relationship between a silver content and a $NO_x$ purification ratio for a $NO_x$ selective reduction catalyst layer containing the nickels 23a of 1.8 g/liter.

The nickels 23 is a material with a high oxidizing ability. Accordingly, the nickels 23 dissolve (oxidize) a reducing agent such as the HC by being contained in the $NO_x$ selective reduction catalyst layer 20. Thus, the caulking becomes difficult to occur.

In addition, as materials having the oxidizing ability, although platinum (Pt), palladium (Pd), rhodium (Rh), and the like are cited other than the nickels 23, these are too strong in the oxidizing ability and burn a reducing agent, an intermediate body of HC—NO, and the like, thereby the $NO_x$ purification ratio tending to become lowered. But the nickels 23 have an adequate oxidizing ability compared to the platinum (Pt) and the like, they can be favorably used.

Here, a content of the nickels 23 is preferable to be within a range of not less than 0.9 mass percent and not more than 3.6 mass percent for the mass of the $NO_x$ selective reduction catalyst layer 20. This is because when the content of the nickels 23 becomes less than 0.9 mass percent, the oxidizing ability as the nickels 23 totally becomes too low and a reducing agent such as the HC cannot be dissolved, thereby the caulking occurring and the $NO_x$ purification ratio tending to become lowered. On the other hand, when the content of the nickels 23 becomes more than 3.6 mass percent, the oxidization of the reducing agent such as the HC by the nickels 23 prevails, that is, the reducing agent to reduce the $NO_x$ is preferentially oxidized (burned) and consumed, and resultingly, the $NO_x$ purification ratio tends to become lowered.

Next, the second type of a $NO_x$ selective reduction catalyst layer 20 will be described.

Figure 3B:
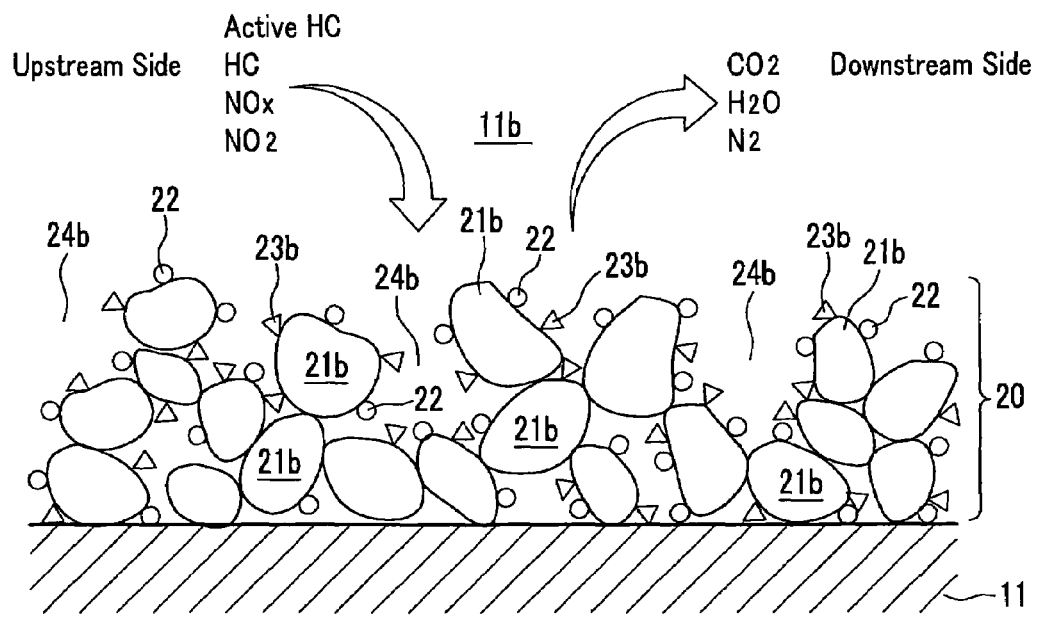

As shown in FIG. 3B, the $NO_x$ selective reduction catalyst layer 20 is formed of γ-aluminas 21b that are porous supports that become a skeleton, and silvers 22 and magnesiums 23b supported on surfaces of the γ-alumina 21b as main portions thereof. Inside the $NO_x$ selective reduction catalyst layer 20 are formed a plurality of narrow porosities 24b opening to narrow porosities 11a of a support body 11. Thus a contact area with an exhaust gas is remarkably increased by the $NO_x$ selective reduction catalyst layer 20 having a plurality of the narrow porosities 24b, thereby the exhaust gas purification system 1 being able to effectively purify the $NO_x$.

The γ-aluminas 21b are lowered in acid titer by supporting magnesiums 23b described later, so the γ-aluminas 21b are preferable to be not more than 120 μmol/g in acid titer. When the acid titer exceeds 120 μmol/g, it causes the caulking in the $NO_x$ selective reduction catalyst layer 20 and the $NO_x$ purification ratio is lowered in some cases.

The magnesiums 23b oxidize such a reducing agent adhered to the $NO_x$ selective reduction catalyst layer 20 and promote it to be dissolved by lowering the acid titer of the γ-aluminas 21b. The content of the magnesiums 23b is preferable to be within a range of not less than 5 mass percent and not more than 10 mass percent for the mass of the γ-aluminas 21b. Since when the content of the magnesiums 23b becomes less than 5 mass percent, the acid titer of the γ-aluminas 21b cannot be sufficiently lowered, the caulking is generated in the $NO_x$ selective reduction catalyst layer 20, and in some cases, the $NO_x$ purification ratio is lowered. On the other hand, when the content of the magnesiums 23b becomes more than 10 mass percent, a specific surface area of the γ-aluminas 21b becomes smaller and a dispersion degree of the silvers 22 is lowered, thereby the $NO_x$ purification ratio becoming lowered in some cases.

A role of the silvers 22 and their favorable/optimum content ranges in the $NO_x$ selective reduction catalyst layer 20 are same as described and shown in the first type.

Subsequently, operation of the exhaust gas purification system 1 related to the embodiments is described, referring to FIGS. 1 to 3A and 3B as needed and depending on the types of the $NO_x$ selective reduction catalyst layer 20 if necessary.

For example, when an engine not shown in the drawings firstly starts, an exhaust gas is supplied from the upstream side of the exhaust gas purification system 1. Then a reducing agent is added in the exhaust gas from the reducing agent adding means 2.

It is preferable to adjust an added amount of the reducing agent depending on a gas amount as needed. That is, for example, when applying the exhaust gas purification system 1 to an exhaust system connected to an engine of a vehicle, ship, and the like, it may be acceptable to measure a relationship between a engine rotation number and a $NO_x$ amount in a discharged exhaust gas in advance, and based on this, to provide a reducing agent adding control device consisting of a CPU and the like.

Then, make the power source of the plasma reactor 3 on, generate plasma, convert the $NO_x$ in the exhaust gas to $NO_2$, and produce an active kind such as a radical from a reducing agent such as the HC.

An exhaust gas including the HC, active kind such as the radical (hereinafter referred to as "active HC"), $NO_2$, and $NO_x$ is supplied to the narrow porosities 11a of the $NO_x$ selective reduction catalyst unit 4 (see FIG. 2).

When the exhaust gas is supplied to the narrow porosities 11a, the HC, active HC, $NO_2$, $NO_x$, and the like near, as shown in FIG. 3A, a surface of the $NO_x$ selective reduction catalyst layer 20, and a part of them invades in the continuous narrow porosities 24a. Then, the $NO_2$ and $NO_x$ are rapidly dissolved into $CO_2$, $H_2O$, and $N_2$ by the HC and active HC.

Additionally in the case of the first type of the $NO_x$ selective reduction catalyst layer 20, even when a supplied amount of $NO_2$, $NO_x$, and the like to the narrow porosities 11a varies due to a rapid variation of an engine rotation number and an excess HC is supplied to the continuous narrow porosities 24a of the $NO_x$ selective reduction catalyst layer 20, the HC is dissolved by the nickels 23a with a high oxidizing ability.

Accordingly, incrustations are never formed on surfaces of the porous supports 21a so as to cover the silvers 22 and nickels 23a. Thus, even when the $NO_x$ selective reduction catalyst unit 4 is continually used, the $NO_x$ purification ratio never becomes lowered.

Such the exhaust gas purification system 1 enables the NOx in an exhaust gas to be favorably purified without generating the caulking in a higher NOx purification ratio.

On the other hand, in the case of the second type of the $NO_x$ selective reduction catalyst layer 20, after the $NO_2$ and $NO_x$ are rapidly dissolved into $CO_2$, $H_2O$, and $N_2$ by the HC and active HC, the HC adheres to the γ-aluminas 21b, and the γ-aluminas 21b that are lowered in the acid titer of the magnesiums 23b promote HC oxidation. As a result, since the adhered HC is rapidly dissolved into $CO_2$ and $H_2O$, the HC never deposits on the surfaces of the γ-aluminas 21b supporting the silvers 22 and magnesiums 23b. Accordingly, since the exhaust gas purification system 1 maintains an activity of the $NO_x$ selective reduction catalyst layer 20 for the $NO_x$ over time, the NOx purification ratio never becomes lowered.

Embodiments

Although the embodiments of the present invention are described below, the invention is not limited to the embodiments below.

Embodiment 1

(1) Manufacturing of Catalyst Component for Use in $NO_x$ Selective Reduction Catalyst Unit Silver nitrate ($AgNO_3$) of 4.72 g, bemite (γ-$Al_2O_3$·$H_2O$) of 127 g, nickel nitrate ($Ni(NO_3)_2$) of 9.9 g, pure water of 1000 g were put in an egg plant shaped flask and stirred, and excess water was removed with an evaporator. Then, its solid content was dried at 200 degrees Celsius for two hours in a drying furnace. After then, it was baked at 200 degrees Celsius for two hours in a muffle furnace and Ag/Ni/$Al_2O_3$ catalyst powders were obtained.

The Ag/Ni/$Al_2O_3$ catalyst powders of 90 g thus obtained, an alumina binder ($Al_2O_3$: concentration of 20%), and pure water of 150 g were put in a pot together with alumina balls, wetly pulverized for 12 hours, and a catalyst slurry was adjusted.

In the obtained catalyst slurry, for appropriate hours, was dipped a cordierite honeycomb support body of which honeycomb volume was 30 milliliter, a density per unit area of narrow porosities was 62.0 cell/$cm^2$ (400 cell/$inch^2$), and an aperture diameter was 152 μm (six mil). After then, the honeycomb support body was taken out of the catalyst slurry, and after an excess catalyst slurry being removed by air spray, the honeycomb support body was dried at 150 degrees Celsius for one hour.

These procedures were repeated until a predetermined catalyst support amount was obtained.

After the predetermined catalyst support amount was obtained, the honeycomb support body was baked at 500 degrees Celsius for two hours in the muffle furnace.

Thus, a $NO_x$ selective reduction catalyst layer, which contains silver and nickel and makes γ-alumina a main composition, was formed on a narrow porosity wall surface of the honeycomb support body, thereby a catalyst component used in the embodiment 1 being manufactured.

Meanwhile, for a unit volume of the narrow porosities of the honeycomb support body, an amount of the $NO_x$ selective reduction catalyst layer (wash-coat amount) was 150 g/liter, a silver content was 4.1 g/liter, and a nickel content was 2.7 g/liter.

Accordingly, for the $NO_x$ selective reduction catalyst layer, the silver content becomes 2.7 mass percent and the nickel content becomes 1.8 mass percent.

(2) Configuration of Exhaust Gas Purification System

Next, a configuration of an exhaust gas purification system related to the embodiment 1 will be described referring to FIGS. 5 and 6.

Figure 5:
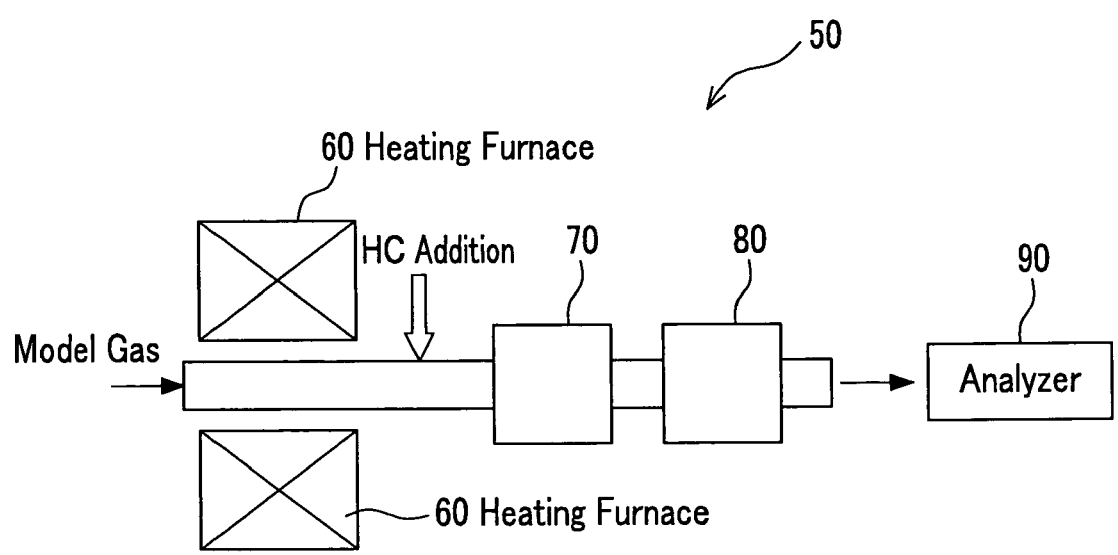
FIG. 5 is a view schematically showing a configuration of an exhaust gas purification system related to some of the embodiments of the invention.

As shown in FIG. 5, an exhaust gas purification system 50 related to the embodiment 1 is equipped, from an upstream side toward downstream side, with a heating furnace 60 that heats a model gas, a plasma reactor 70, and a $NO_x$ selective reduction catalytic unit 80. A desired amount of the HC is designed to be able to be added in a model gas as a reducing agent by an appropriate device between the heating furnace 60 and plasma reactor 70. In addition, at a downstream side of the exhaust gas purification system 50 is provided an analyzer 90 that analyzes compositions of a purified gas.

Figure 6:
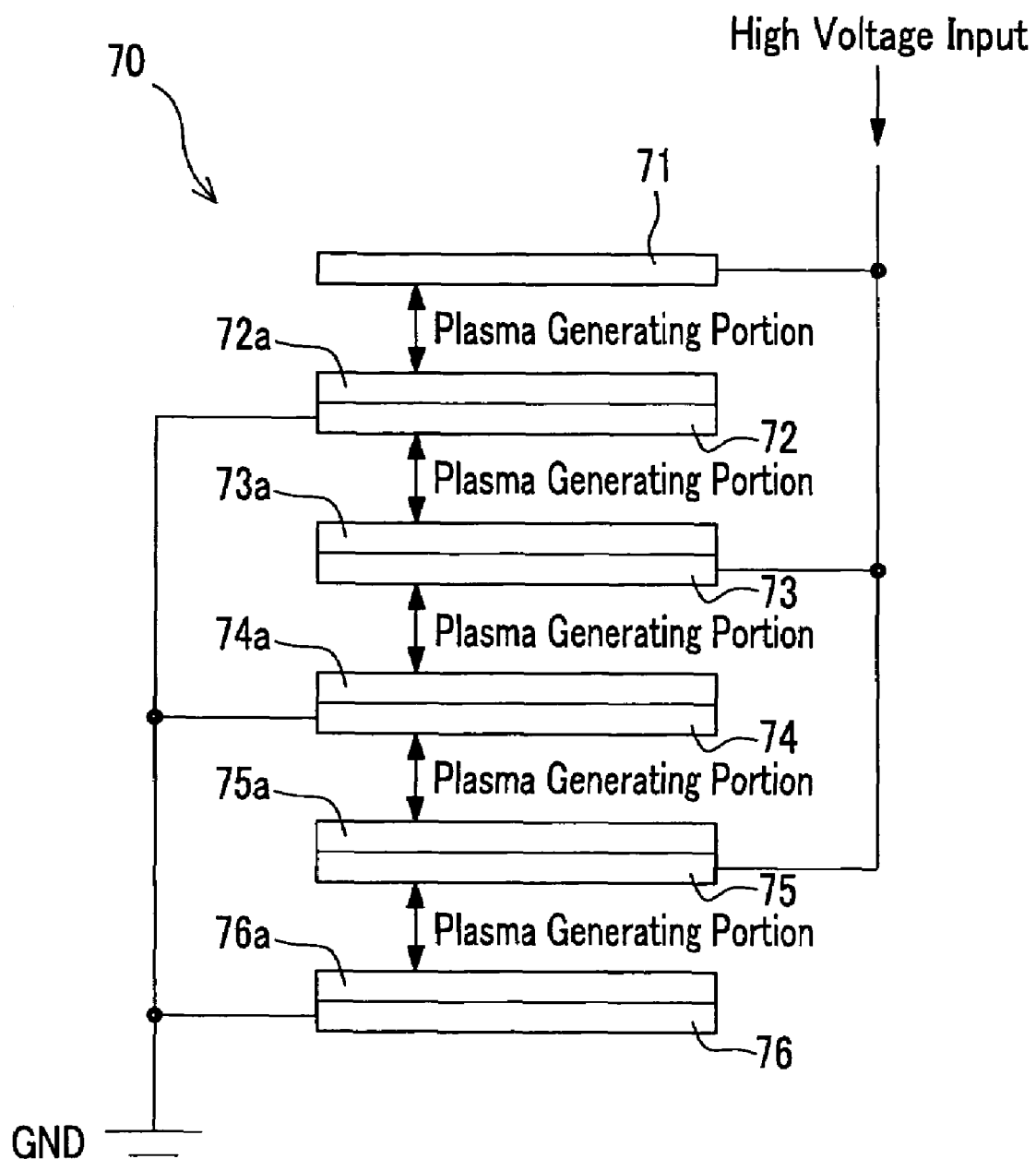
FIG. 6 is a side section view schematically showing a configuration of a plasma reactor of the exhaust gas purification system shown in FIG. 5.

The plasma reactor 70 for use in the exhaust gas purification system 50 was designed to be configured as shown in FIG. 6: sides of metal electrodes 72, 73, 74, 75, and 76 facing a metal electrode 71 out of metal electrodes 71, 72, 73, 74, 75, and 76, which were parallelly disposed at a predetermined distance in this order, were coated with dielectrics 72a, 73a, 74a, 75a, and 76a, respectively; the metal electrodes 71, 73, and 75 were connected to a high voltage input side; and the metal electrodes 72, 74, and 76 were connected to an earthing side (GND), whereby plasmas were generated between the dielectrics 72a, 73a, 74a, 75a, and 76a and the metal electrodes 71, 72, 73, 74, and 75 opposite to each other at the distance (plasma generating portions).

That is, five plasma generating portions were lamellarly formed in the plasma reactor 70 and the model gas where the HC was added was supplied to the portions.

The metal electrodes 71, 72, 73, 74, 75, and 76 were formed of SUS 316, their thickness was designed to be 1.0 mm, and their size was designed to be 20 mm×50 mm. The dielectrics 72a, 73a, 74a, 75a, and 76a were formed of alumina ceramics ($Al_2O_3$) and their coating thickness was designed to be 0.5 mm. In addition, distances between the metal electrode 71 and dielectrics 72a, the metal electrode 72 and dielectric 73a, the metal electrode 73 and dielectric 74a, the metal electrode 74 and dielectric 75a, and the metal electrode 75 and dielectric 76a were designed to be 0.5 mm, respectively.

Plasma generating conditions by the plasma reactor 70 were designed as follows: an alternate current of sine waves, whose frequency was 200 Hz and applied voltage was 7.6 kV, was input in the plasma reactor 70; and at that time, electric power, an electric field strength, and electric power density were made 3.1 W, 7.6 kV/mm, and 1.2 W/cm$^3$, respectively.

The $NO_x$ selective catalytic reduction unit 80 is configured by charging the catalyst component manufactured in the embodiment 1 within a predetermined casing.

A model gas composed of nitrogen monoxide (NO) of 300 ppm, carbon monoxide (CO) of 1100 ppm, carbon dioxide ($CO_2$) of 4 volume percent, oxygen ($O_2$) of 11 volume percent, pure water of 4 volume percent, and nitrogen ($N_2$) as balance was used. Meanwhile, the concentration of each composition in the model gas is a value at 25 degrees Celsius (room temperature) and 1013 hPa (one atmospheric pressure).

As the HC, normal hexadecane (n-$C_{16}H_{34}$) of 200 ppm converted to a carbon amount was used.

(3) Evaluation Test of Exhaust Gas Purification System

Following evaluation tests of the exhaust gas purification system related to the embodiment 1 were performed:

(3-1) Change Over Time Test of $NO_x$ Purification Ratio and Evaluation Thereof

Figure 7A:
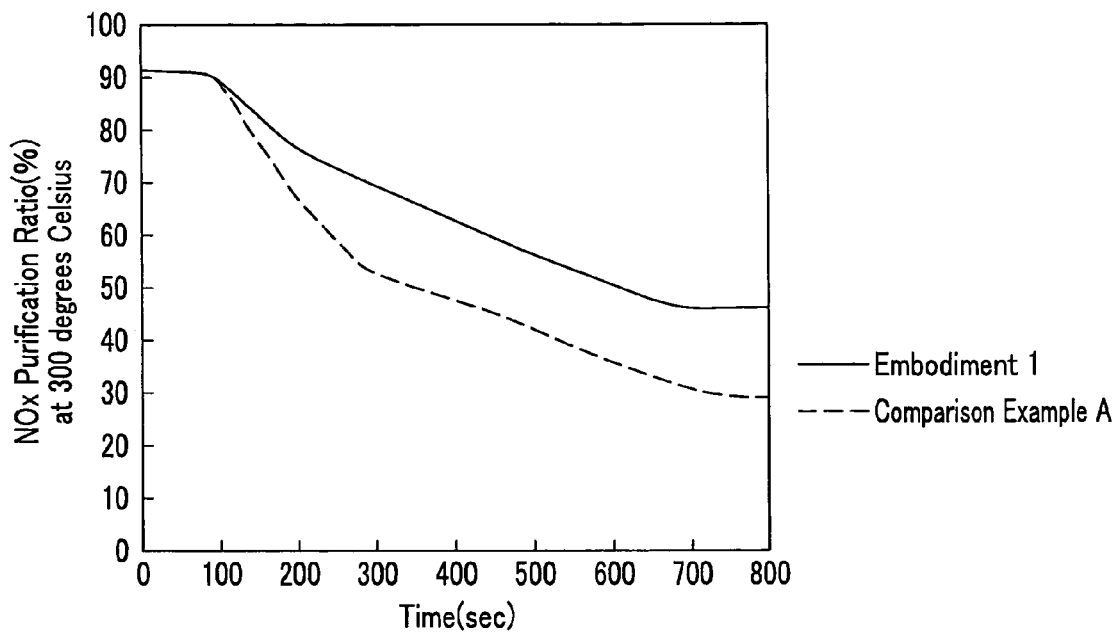
FIG. 7A is a graph showing a change over time of a $NO_x$ purification ratio.

In the evaluation test, the model gas heated up to 300 degrees Celsius was introduced in the exhaust gas purification system 50 equipped with the catalyst component of the embodiment 1 and a $NO_x$ amount exhausted from the system 50 was measured with the analyzer 90 (see FIG. 5) over time. And $NO_x$ purification ratios over time based on its measurement results were calculated. The change over time of the $NO_x$ purification ratios in the system 50 is shown in FIG. 7A.

(3-2) Measurement Test of Maximum $NO_x$ Purification Ratio Using Exhaust Gas Purification System and Evaluation Thereof In the evaluation test, the model gas heated up to 300 degrees Celsius was introduced into the exhaust gas purification system 50 equipped with the catalyst component of the embodiment 1, and those of embodiments 2 and 3 described later, and into an exhaust gas purification system equipped with a catalyst component of a comparison example. And a $NO_x$ amount exhausted from the system 50 was measured with the analyzer 90 (see FIG. 5). Then, the $NO_x$ purification ratios of the system 50 were calculated using a following equation (1):

$$\text{a } NO_x \text{ purification ratio (\%)} = ((\text{a } NO_x \text{ value in a model gas} - \text{a } NO_x \text{ value of an analyzer})/(\text{the } NO_x \text{ value in the model gas})) \times 100. \quad (\text{eq. 1})$$

Figure 7B:
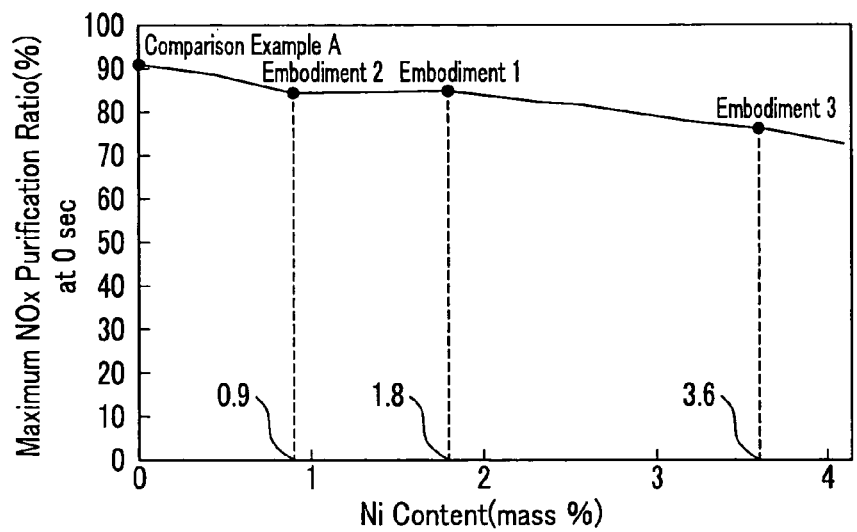
FIG. 7B is a graph showing a relationship between a nickel content in the $NO_x$ selective reduction catalyst layer of FIG. 3A and a maximum $NO_x$ purification ratio just after a measurement start (t=0).

Meanwhile, a $NO_x$ purification ratio just after a measurement start was assumed to be a maximum $NO_x$ purification ratio. The measurement result is shown in FIG. 7B.

Embodiment 2

An exhaust gas purification system was configured same as in the embodiment 1 except that a making method of a $NO_x$ selective reduction catalyst layer related to the embodiment 2 made silver nitrate ($AgNO_3$) 4.95 g and a nickel content per unit volume of narrow porosities of the honeycomb support body 1.35 g/liter (nickel content for the $NO_x$ selective reduction catalyst layer: 0.9 mass percent) in making $Ag/Ni/Al_2O_3$ powders. And the $NO_x$ purification ratio was measured same as in the embodiment 1. Its result is shown in FIG. 7B.

Embodiment 3

An exhaust gas purification system was configured same as in the embodiment 1 except that a making method of a $NO_x$ selective reduction catalyst layer related to the embodiment 3 made silver nitrate ($AgNO_3$) 19.8 g and a nickel content per unit volume of narrow porosities of the honeycomb support body 5.4 g/liter (nickel content for the $NO_x$ selective reduction catalyst layer: 3.6 mass percent) in making $Ag/Ni/Al_2O_3$ powders. And the $NO_x$ purification ratio was measured same as in the embodiment 1. Its result is shown in FIG. 7B.

Comparison Example A

An exhaust gas purification system was configured same as in the embodiment 1 except that a making method of a $NO_x$ selective reduction catalyst layer related to the comparison example A adjusted $Ag/Ni/Al_2O_3$ powders without using silver nitrate ($AgNO_3$). Meanwhile, for a unit volume of narrow porosities of the honeycomb support body, the $NO_x$ selective reduction catalyst layer was 150 g/liter and a silver content was 4.1 g/liter (silver content for the $NO_x$ selective reduction catalyst layer: 2.7 mass percent). And the $NO_x$ purification ratio was measured same as in the embodiment 1.

Table 1 summarizes the used materials in manufacturing the $NO_x$ selective reduction catalyst layers related to the embodiments 1 to 3 and comparison example A thus described, and contents of silver and nickel in the $NO_x$ selective reduction catalyst layers.

TABLE 1

|  | Embodiment 1 | Embodiment 2 | Embodiment 3 | Comparison example A |
|---|---|---|---|---|
| Making of $Ag/Ni/Al_2O_3$ catalyst powder | | | | |
| Silver nitrate (g) | 4.72 | 4.72 | 4.72 | 4.72 |
| Bemite (g) | 127 | 127 | 127 | 127 |
| Nickel nitrate (g) | 9.9 | 4.95 | 19.8 | — |
| Pure water (g) | 1000 | 1000 | 1000 | 1000 |

TABLE 1-continued

|  | Embodiment 1 | Embodiment 2 | Embodiment 3 | Comparison example A |
|---|---|---|---|---|
| Making of catalyst slurry | | | | |
| Ag/Ni/Al$_2$O$_3$ catalyst powder (g) | 90 | 90 | 90 | 90 |
| Alumina binder (g) | 50 | 50 | 50 | 50 |
| Pure water (g) | 150 | 150 | 150 | 150 |
| Amount of NO$_x$ selective reduction catalyst layer (wash coat amount) (g/liter) | 150 | 150 | 150 | 150 |
| Ag content (g/liter) | 4.1 | 4.1 | 4.1 | 4.1 |
| Ag content (mass percent) | 2.7 | 2.7 | 2.7 | 2.7 |
| Ni content (g/liter) | 2.7 | 1.35 | 5.4 | — |
| Ni content (mass percent) | 1.8 | 0.9 | 3.6 | — |

(4) Measurement Results of Exhaust Gas Purification Systems

Subsequently, the measurement results will be described, referring to FIGS. 7A and 7B: FIG. 7A is a graph showing a change over time of the NO$_x$ purification ratios in the model gas heated up to 300 degrees Celsius with respect to the embodiment 1 and comparison example A; FIG. 7B is a graph showing a relationship between a Ni content and maximum NO$_x$ purification ratios just after the tests (that is, t=0 in FIG. 7A) with respect to the embodiments 1 to 3 and comparison example A.

(4-1) Change Over Time of NO$_x$ Purification Ratios in Exhaust Gas Purification Systems Related to Embodiment 1 and Comparison Example A As obvious from FIG. 7A, the embodiment 1 containing nickel in the NO$_x$ selective reduction catalyst layer turns out to be smaller in a decreasing rate based on the change over time of the NO$_x$ purification ratios than the comparison example A not containing nickel in the layer. Thus, it turns out that the caulking is difficult to occur and durability is improved by nickel being contained in the NO$_x$ selective reduction catalyst layer.

(4-2) Maximum NO$_x$ Purification Ratios in Exhaust Gas Purification Systems Related to Embodiments 1 to 3 and Comparison Example A As obvious from FIG. 7B, it turns out that the NO$_x$ can be favorably purified when the nickel content within the NO$_x$ selective reduction catalyst layers is within the range of not less than 0.9 mass percent and not more than 3.6 mass percent.

In addition, as obvious from FIG. 7B, the exhaust gas purification systems related to the invention, which are equipped with the NO$_x$ selective reduction catalyst layers that contain nickel not more than 3.6 mass percent, maintain favorable and good maximum NO$_x$ purification ratios compared to the exhaust gas purification system that does not contain nickel (comparison example A). In other words, when the nickel contents for an amount of a NO$_x$ selective reduction catalyst layer are not more than 3.6 mass percent, it turns out that the NO$_x$ in an exhaust gas can be favorably purified.

Embodiment 4

(1) Manufacturing of Catalyst Component for Use in NO$_x$ Selective Reduction Catalyst Unit Bemite ($\gamma$-Al$_2$O$_3$.H$_2$O) of 150 g, magnesium nitrate (Mg(NO$_3$)$_2$) of 48.8 g, and pure water of 1000 g were put in an egg plant shaped flask, and excess water was removed with an evaporator. Then, its solid content was dried at 200 degrees Celsius for two hours in a drying furnace. After then, it was baked at 200 degrees Celsius for two hours in a muffle furnace and $\gamma$-alumina supporting Mg was adjusted. Meanwhile, an acid titer of the Mg supporting $\gamma$-alumina was 70 $\mu$mol/g.

Next, the obtained Mg supporting $\gamma$-alumina of 97 g, silver nitrate (AgNO$_3$)) of 4.72 g, and pure water of 1000 g were put in an egg plant shaped flask, and excess water was removed with an evaporator. Then, its solid content was dried at 200 degrees Celsius for two hours in the drying furnace. After then, it was baked at 200 degrees Celsius for two hours in the muffle furnace and $\gamma$-alumina powders supporting Ag/Mg were adjusted.

Next, the obtained Ag/Mg supporting $\gamma$-alumina powders of 90 g, an alumina binder (Al$_2$O$_3$ concentration: 20 mass percent) of 50 g, and pure water of 150 g were put in a pot together with alumina balls and wetly pulverized for 12 hours, thereby a catalyst slurry being adjusted.

In the obtained catalyst slurry was dipped a cordierite honeycomb support body of which honeycomb volume was 30 milliliter, a density per unit area of narrow porosities was 62.0 cell/cm$^2$ (400 cell/inch$^2$), and an aperture diameter was 152 $\mu$m (six mil). After then, the honeycomb support body was taken out of the catalyst slurry, an excess catalyst slurry was removed from it by air spray, and then the honeycomb support body was dried at 150 degrees Celsius for one hour. And after the NO$_x$ selective reduction catalyst layer 20 (see FIG. 2) of a predetermined thickness was made to form on inner wall surfaces of narrow porosities of the honeycomb support body by repeating these procedures, the catalyst component was manufactured by being baked at 500 degrees Celsius for two hours in the muffle furnace. Meanwhile, the thickness of the $NO_x$ selective reduction catalyst layer 20 (wash coat) formed with a wash coat method was 150 g/liter converted to the mass of the layer 20 per unit volume of the narrow porosities 11a. Hereinafter the converted thickness is simply called a "wash coat amount." In addition, a silver content per unit volume of the narrow porosities 11a was 4.1 g/liter (silver content in the $NO_x$ selective reduction catalyst layer 20: 2.7 mass percent).

Meanwhile, a configuration of an exhaust gas purification system, a model gas, an evaluation test of the exhaust gas purification system, and an equation for calculating the $NO_x$ purification ratios used in the embodiment 4 are same as in the embodiment 1 except for the catalyst component. The catalyst component used for the embodiment 4 and embodiments 5 and 6 described later is the γ-aluminas 21 supporting Ag/Mg on their surfaces.

Figure 8A:
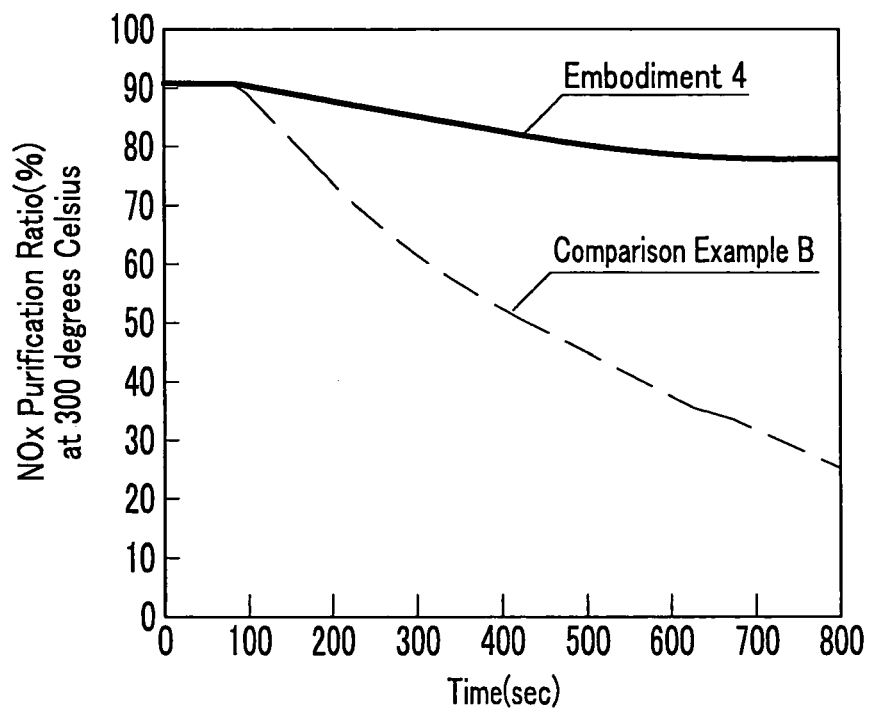
FIG. 8A is a graph showing a change over time of a $NO_x$ purification ratio.
Figure 8B:
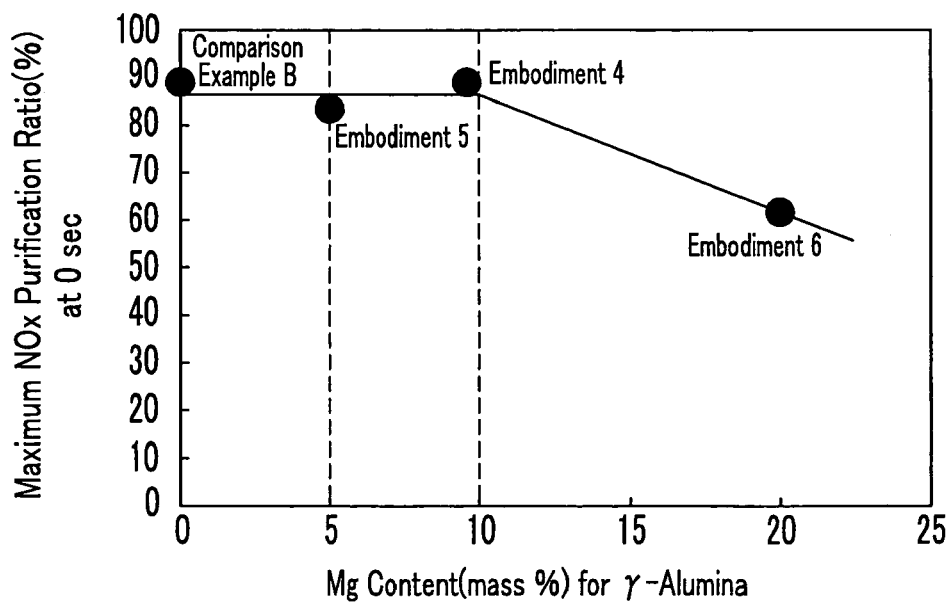
FIG. 8B is a graph showing a relationship between a magnesium content in the $NO_x$ selective reduction catalyst layer of FIG. 3B and a maximum $NO_x$ purification ratio just after a measurement start (t=0).

The change over time of the $NO_x$ purification ratios in the system 50 is shown in FIG. 8A. The measurement result of maximum $NO_x$ purification ratios is shown in FIG. 8B.

Embodiment 5

Except for changing a usage amount of magnesium nitrate (48.8 g) in the embodiment 4 to 24.4 g, the exhaust gas purification system 50 for a test was configured same as in the embodiment 4 and a measurement test of the maximum NOx purification ratio was performed. Its result is shown in FIG. 8b. Meanwhile, an Mg supported amount in the Mg supporting γ-alumina was 5 mass percent for the γ-alumina, and an acid titer of the Mg supporting γ-alumina was 120 μmol/g.

Embodiment 6

Except for changing a usage amount of magnesium nitrate (48.8 g) in the embodiment 4 to 97.6 g, the exhaust gas purification system 50 for a test was configured same as in the embodiment 4 and a measurement test of the maximum NOx purification ratio was performed. Its result is shown in FIG. 8b. Meanwhile, an Mg supported amount in the Mg supporting γ-alumina was 20 mass percent for the γ-alumina, and an acid titer of the Mg supporting γ-alumina was 50 μmol/g.

Comparison Example B (1) Manufacturing of Catalyst Component for Use in $NO_x$ Selective Reduction Catalyst Unit Silver nitrate $(Ag(NO_3))$ of 4.72 g, γ-alumina of 97 g, and pure water of 1000 g were put in an egg plant shaped flask, and excess water was removed with an evaporator. Then, its solid content was dried at 200 degrees Celsius for two hours in a drying furnace. After then, it was baked at 200 degrees Celsius for two hours in a muffle furnace and γ-alumina powders supporting Ag were adjusted. Meanwhile, an acid titer of the used γ-alumina was 135 μmol/g.

Next, the obtained Ag supporting γ-alumina of 90 g, an alumina binder ($Al_2O_3$ concentration: 20 mass percent) of 50 g, and pure water of 150 g were put in a pot together with alumina balls and wetly pulverized for 12 hours, thereby a catalyst slurry being adjusted.

In the obtained catalyst slurry was dipped a honeycomb support body same as used in the embodiment 4. Then the honeycomb support body was taken out of the catalyst slurry, an excess catalyst slurry was removed from it by air spray, and then the honeycomb support body was dried at 150 degrees Celsius for one hour. And after a $NO_x$ selective reduction catalyst layer of a predetermined thickness was made to form on inner wall surfaces of narrow porosities of the honeycomb support body by repeating these procedures, the catalyst component was manufactured by being baked at 500 degrees Celsius for two hours in the muffle furnace. Meanwhile, a wash coat amount of the $NO_x$ selective reduction catalyst layer was 150 g/liter. A silver content per unit volume of the narrow porosities 11a was 4.1 g/liter (silver content for the γ-alumina: 2.81 mass percent).

(2) Configuration of Exhaust Gas Purification System, Model Gas, and Evaluation Test of Exhaust Gas Purification System Except for using the catalyst component manufactured for the comparison example B as a substitute of the catalyst component for the embodiment 4, an exhaust gas purification system for a test was configured same as in the embodiment 4, and thus an evaluation test of a change over time of the $NO_x$ purification ratios and a measurement test of the maximum $NO_x$ purification ratio were performed. Their results are shown in FIGS. 8A and 8B, respectively.

Table 2 summarizes the used materials in manufacturing the $NO_x$ selective reduction catalyst layers related to the embodiments 4 to 6 and comparison example B thus described, and contents of Ag and Mg in the $NO_x$ selective reduction catalyst layers.

TABLE 2

|  | Embodiment 4 | Embodiment 5 | Embodiment 6 | Comparison example B |
|---|---|---|---|---|
| Making of Mg/Ag/Al$_2$O$_3$ catalyst powder | | | | |
| Silver nitrate (g) | 4.72 | 4.72 | 4.72 | 4.72 |
| Bemite (g) | 105 | 105 | 105 | 97 |
| Magnesium nitrate (g) | 48.8 | 24.4 | 97.6 | — |
| Pure water (g) | 1000 | 1000 | 1000 | 1000 |
| Making of catalyst slurry | | | | |
| Ag/Mg/Al$_2$O$_3$ catalyst powder (g) | 90 | 90 | 90 | 90 |
| Alumina binder (g) | 50 | 50 | 50 | 50 |
| Pure water (g) | 150 | 150 | 150 | 150 |

TABLE 2-continued

|  | Embodiment 4 | Embodiment 5 | Embodiment 6 | Comparison example B |
|---|---|---|---|---|
| Converted thickness of $NO_x$ selective reduction catalyst layer (wash-coat amount) (g/liter) | 150 | 150 | 150 | 150 |
| Ag content (g/liter) | 4.1 | 4.1 | 4.1 | 4.1 |
| Ag content (mass percent) | 2.7 | 2.7 | 2.7 | 2.7 |
| Mg content (mass percent) | 10 | 5 | 20 | — |

Note:
γ-alumina was used in the example B.

Evaluation Results of Exhaust Gas Purification Systems Related to Embodiments 4 to 6

As obvious from FIG. 8A, the exhaust gas purification system for tests equipped with the catalyst component of the comparison example B is remarkably lowered in the change over time of the $NO_x$ purification ratios, whereas the exhaust gas purification system 50 for tests equipped with the catalyst component of the embodiment 4 maintains favorable $NO_x$ purification ratios. As obvious from the result, the exhaust gas purification system 50 for tests related to the invention prevents the caulking of the $NO_x$ selective reduction catalyst layer 20 by using the γ-alumina, of which acid titer is lowered, as the layer 20.

In addition, as obvious from FIG. 8B, the exhaust gas purification system 50 for tests related to the invention equipped with the $NO_x$ selective reduction catalyst layer 20, which contains magnesium of not more than 10 mass percent for the γ-alumina, maintains favorable good maximum $NO_x$ purification ratios, even compared to an exhaust gas purification system for tests that is equipped with another $NO_x$ selective reduction catalyst layer (comparison example B) not containing magnesium. That is, if a magnesium content in the $NO_x$ selective reduction catalyst layer 20 is not more than 10 mass percent for the γ-alumina, it turns out that the $NO_x$ can be favorably purified.

In the embodiments 1 to 6, although the exhaust gas purification system 1 is designed so that each separate reducing agent adding means 2, plasma reactor 3, and $NO_x$ selective reduction catalyst unit 4 are connected through the piping P1, P2, and P3, other than this, for example, the reducing agent adding means 2, plasma reactor 3, and $NO_x$ selective reduction catalyst unit 4 may be configured as an integrated type without providing piping. Such the integrated type of an exhaust gas purification system makes downsizing possible, and thereby, for example, it is easily mounted on a compact car.

Embodiment 7

Figure 9:
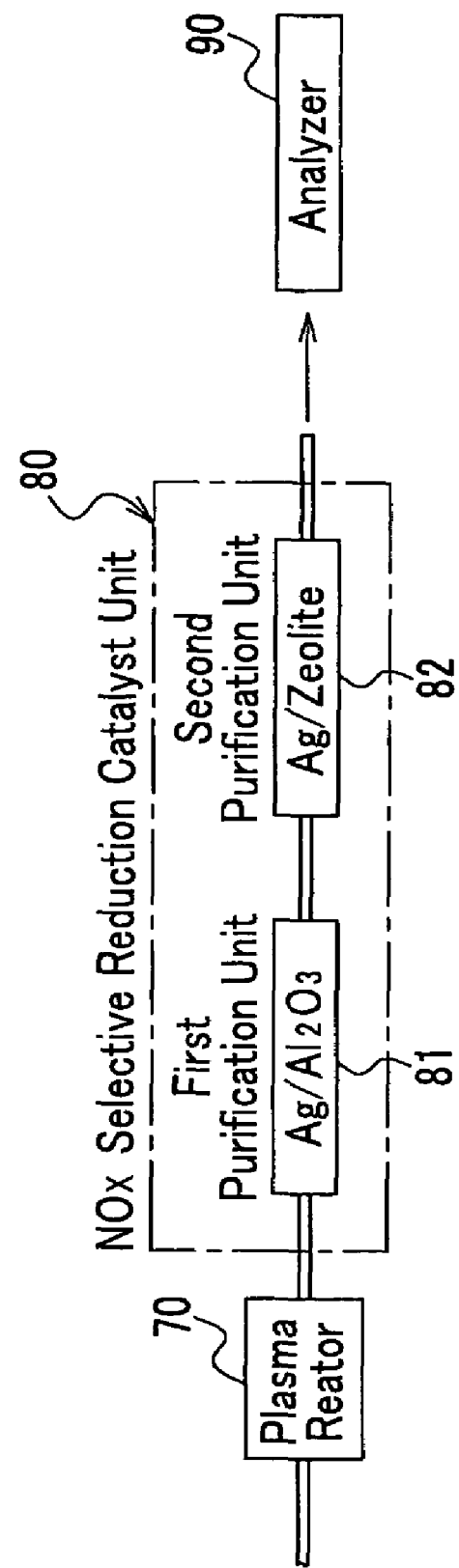
FIG. 9 is an enlarged view of a $NO_x$ selective reduction catalyst unit of FIG. 5 related to one of the embodiments of the invention.

In the exhaust gas purification system 50 shown in FIG. 5, the embodiment 7 is same as in embodiments 1 to 6 except that a configuration of the $NO_x$ selective reduction catalyst unit 80 is different. That is, as shown in FIG. 9, the unit 80 has a first purification unit 81 where an activated exhaust gas is introduced via the plasma reactor 70 and a second purification unit 82 where an exhaust gas introduced via the first purification unit 81. The unit 81 is equipped with an $Ag/Al_2O_3$ catalyst where Ag is supported by alumina; the unit 82 is equipped with an Ag/zeolite catalyst where Ag is supported by zeolite. Each Ag supported amount of the $Ag/Al_2O_3$ catalyst and Ag/zeolite catalyst is set to be not less than 2 mass percent and not more than 5 mass percent. However, when the Ag supported amount is less than 2 mass percent, it becomes meaningless to make Ag supported; on the other hand, since when the Ag supported amount is more than 5 mass percent, the HC of a reducing agent of the $NO_x$ is preferentially oxidized, an HC amount is decreased, thereby purification performance of the $NO_x$ being lowered. As zeolite, a ferrierite type, MFI type, β type, Y type, and the like are used.

(1) Manufacturing of Catalyst Component for Used in First Purification Unit

Silver nitrate ($Ag(NO_3)$) of 4.72 g (silver amount: 3 g), γ-alumina of 97 g, and pure water of 1000 g were put in an egg plant shaped flask, and excess water was removed with an evaporator. Then, its solid content was dried at 150 degrees Celsius for one hour in a drying furnace. After then, it was baked at 500 degrees Celsius for two hours in a muffle furnace, and $Ag/Al_2O_3$ catalyst powders where Ag was supported by alumina were obtained. An Ag supported amount of the catalyst was about 3 mass percent.

Next, the obtained $Ag/Al_2O_3$ catalyst powders of 90 g, an alumina binder ($Al_2O_3$ concentration: 20 mass percent) of 50 g, and pure water of 150 g were put in a pot together with 80 alumina balls of diameter 5 mm and wetly pulverized for 12 hours with a ball mill, thereby a catalyst slurry being obtained.

In the obtained catalyst slurry was dipped a cordierite honeycomb support body of which honeycomb volume was 30 milliliter, a density per unit area of narrow porosities was 62.0 cell/cm² (400 cell/inch²), and an aperture diameter was 152 μm (six mil). After then, the honeycomb support body was taken out of the catalyst slurry, and after an excess catalyst slurry being removed by air spray, the honeycomb support body was given a heating treatment at 150 degrees Celsius for one hour. The dipping, the removal of the excess catalyst slurry, and the heating were repeated four times. Then it was baked at 500 degrees Celsius and for two hours in the muffle furnace, thereby a wash coat being obtained. The wash coat amount was 100 g/liter and an Ag amount in the wash coat was about 3 g/liter.

(2) Manufacturing of Catalyst Component D for Used in Second Purification Unit

Silver nitrate ($Ag(NO_3)$) of 3.15 g (silver amount: 2 g), β-zeolite ($SiO_2/Al_2O_3$: molar ratio=25) of 98 g, and pure water of 1000 g were put in an egg plant shaped flask, and excess water was removed with an evaporator. Then its solid content was dried at 150 degrees Celsius for one hour in a drying furnace. After then, it was baked at 400 degrees Celsius for 12 hours in a muffle furnace, and Ag/zeolite catalyst powders where Ag was supported by β-zeolite were obtained. An Ag supported amount of the catalyst was about 2 mass percent.

Next, the obtained Ag/zeolite catalyst powders of 90 g, a silica binder ($SiO_2$ concentration: 20 mass percent) of 50 g, and pure water of 150 g were put in a pot together with 80 alumina balls of diameter 5 mm and wetly pulverized for 12 hours with a ball mill, thereby a catalyst slurry being obtained.

In the obtained catalyst slurry was dipped a cordierite honeycomb support body of which honeycomb volume was 30 milliliter, a density per unit area of narrow porosities was 62.0 $cell/cm^2$ (400 $cell/inch^2$), and an aperture diameter was 152 μm (six mil). After then, the honeycomb support body was taken out of the catalyst slurry, and after an excess catalyst slurry being removed by air spray, the honeycomb support body was given a heating treatment at 150 degrees Celsius for one hour. The dipping, the removal of the excess catalyst slurry, and the heating were repeated four times. Then it was baked at 400 degrees Celsius and for 12 hours in the muffle furnace, thereby a wash coat being obtained. The wash coat amount was 100 g/liter and an Ag amount in the wash coat was about 2 g/liter.

(3) Exhaust Gas Purification Test

The $NO_x$ selective reduction catalyst unit 80 having the first and second purification units was configured. In addition, a model gas with following compositions were adjusted, assuming an exhaust gas of an diesel engine: nitrogen monoxide (NO), 100 ppm; HC ($C_{16}H_{34}$), 2000 ppm; carbon monoxide (CO), 1100 ppm; carbon dioxide ($CO_2$), 4 mass percent; oxygen ($O_2$), 15 mass percent; pure water, 4 mass percent; and nitrogen ($N_2$) as balance.

As shown in FIG. 5, the model gas was flowed at a rate of 25 liter/min, normal hexadecane that is a reducing agent was added into an exhaust pipe in a concentration of 2000 ppm, moreover the model gas was heated by a heating furnace 60, and still moreover a plasma reactor 70 was actuated by the conditions described in the embodiment 1. After then, an exhaust gas exhausted from the second purification unit 82 was analyzed by an analyzer 90, and a relationship between catalyst temperatures (temperature of $Ag/Al_2O_3$ catalyst and Ag/zeolite catalyst are assumed same) and NOx purification ratios was sought, thereby a result of line (a) of FIG. 10 being obtained. According to the line (a) of FIG. 10, the NOx selective reduction catalyst unit 80 equipped with the first/second purification units 81 and 82 turn out to have excellent NOx purification performance. In this case there exists a maximum NOx purification ratio at a catalyst temperature of about 244 degrees Celsius.

Figure 10:
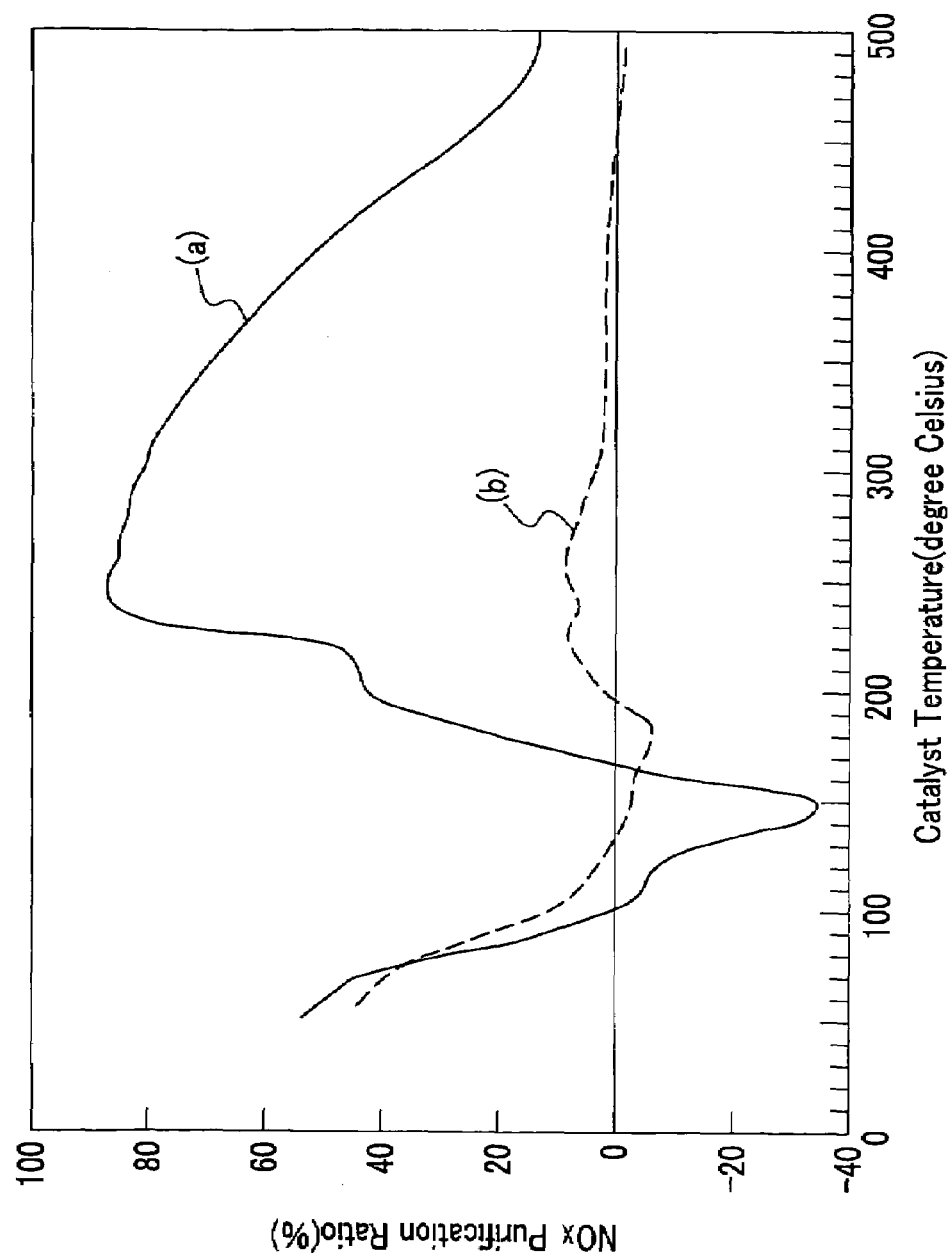
FIG. 10 is a graph showing a relationship between a catalyst temperature and a $NO_x$ purification ratio.
Figure 11:
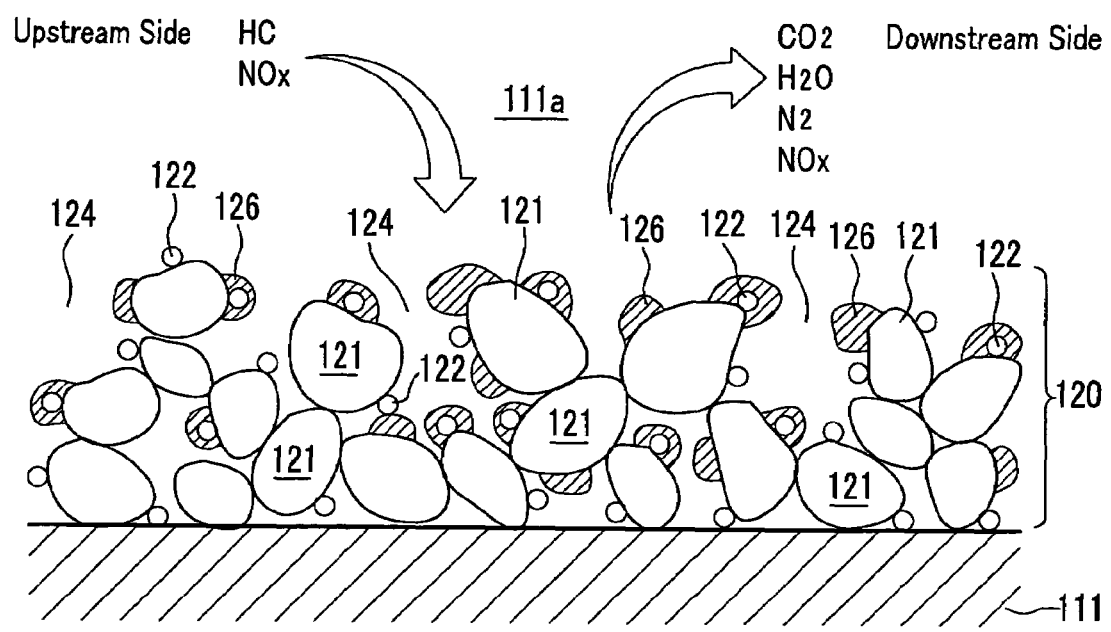
FIG. 11 is a partially enlarged view schematically showing a section of a conventional $NO_x$ selective reduction catalyst layer by partially enlarging the section.

In addition, a NOx purification test was performed in the above same conditions using only the second purification unit 82 for comparison and a result of line (b) of FIG. 10 was obtained. According to the line (b) of FIG. 10, in the comparison example C, it turns out that the NOx purification performance is remarkably low due to an adsorption of normal hexadecane to zeolite.

Meanwhile, in a plurality of cells of the honeycomb support body, the purification units 81 and 82 can be configured as a two-layer structure so that the second purification unit 82 equipped with the Ag/zeolite catalyst is positioned downside and the first purification unit 81 equipped with the $Ag/Al_2O_3$ catalyst is positioned upside.

Thus, although the preferred embodiments of the present invention are described, the invention is not limited to the embodiments and they are changeable as far as the ideas of the invention are not deviated.

What is claimed is:

1. An exhaust gas purification system that is equipped, from an upstream side toward downstream side through which an exhaust gas flows, with a plasma reactor and a $NO_x$ selective reduction catalyst unit having a $NO_x$ selective reduction catalyst layer acting on said exhaust gas, and which system provides a reducing agent adding means adding a reducing agent to said exhaust gas at an upstream side of said plasma reactor, wherein said $NO_x$ selective reduction catalyst layer comprises nickel and a $NO_x$ selective reduction catalyst;

wherein said $NO_x$ selective reduction catalyst comprises a first purification unit where an exhaust gas is introduced via said plasma reactor, and a second purification unit where an exhaust gas is introduced via said first purification unit;

and wherein said first purification unit comprises an $Ag/Al_2O_3$ catalyst where Ag is supported by alumina, and said second purification unit comprises an Ag/zeolite catalyst where Ag is supported by zeolite.

2. An exhaust gas purification system according to claim 1, wherein said nickel content is not less than 0.9 mass percent and not more than 3.6 mass percent for said $NO_x$ selective reduction catalyst layer.

3. An exhaust gas purification system according to any one of claims 1 and 2, wherein said $NO_x$ selective reduction catalyst layer comprises silver.

4. An exhaust gas purification system according to claim 3, wherein said silver content is not less than 1.5 mass percent and not more than 5 mass percent for said $NO_x$ selective reduction catalyst layer.

5. An exhaust gas purification system according to claim 1, wherein said $NO_x$ selective reduction catalyst layer contains γ-alumina that supports magnesium.

6. An exhaust gas purification system according to claim 5, wherein an acid titer of γ-alumina in question becomes not more than 120 μ mol/g by said γ-alumina supporting said magnesium of not less than 5 mass percent and not more than 10 mass percent for the γ-alumina in question.

7. An exhaust gas purification system according to any one of claims 5 and 6, wherein said $NO_x$ selective reduction catalyst layer comprises silver.

8. An exhaust gas purification system according to claim 7, wherein said silver content is not less than 1.5 mass percent and not more than 5 mass percent for said $NO_x$ selective reduction catalyst layer.

9. An exhaust gas purification system according to claim 1, wherein each Ag supported amount in said $Ag/Al_2O_3$ catalyst and said Ag/zeolite catalyst is not less than 2 mass percent and not more than 5 mass percent.

* * * * *